(12) United States Patent
Sato

(10) Patent No.: US 10,060,759 B2
(45) Date of Patent: Aug. 28, 2018

(54) ROTATIONAL ANGLE DETECTING DEVICE AND ANGLE SENSOR UNIT USED THEREIN

(71) Applicant: Valeo Japan Co., Ltd., Saitama (JP)

(72) Inventor: Shunichi Sato, Tokyo (JP)

(73) Assignee: Valeo Japan Co., LTD. (JP)

( * ) Notice: Subject to any disclaimer, the term of this patent is extended or adjusted under 35 U.S.C. 154(b) by 5 days.

(21) Appl. No.: 15/224,642

(22) Filed: Jul. 31, 2016

(65) Prior Publication Data

US 2017/0122776 A1    May 4, 2017

(30) Foreign Application Priority Data

Nov. 3, 2015   (JP) ................................ 2015-216218

(51) Int. Cl.
    *G01D 5/14*    (2006.01)
(52) U.S. Cl.
    CPC ............... *G01D 5/14* (2013.01); *G01D 5/145* (2013.01)
(58) Field of Classification Search
    CPC ........ G01D 5/12–5/2525; G01B 7/003; H03K 17/95; H03K 17/9505–17/952
    See application file for complete search history.

(56) References Cited

U.S. PATENT DOCUMENTS

| | | | | |
|---|---|---|---|---|
| 5,444,369 A * | 8/1995 | Luetzow | .................. | G01B 7/30 123/376 |
| 6,268,722 B1 * | 7/2001 | Kogure | .................. | G01D 5/145 324/207.12 |
| 6,275,627 B1 | 8/2001 | Wu | | |
| 6,479,987 B1 * | 11/2002 | Marx | ........................ | G01B 7/30 324/207.12 |
| 2004/0189288 A1 * | 9/2004 | Mizutani | ................ | G01D 5/145 324/207.25 |
| 2005/0134258 A1 * | 6/2005 | Kogure | .................... | G01D 5/14 324/207.25 |
| 2005/0151535 A1 * | 7/2005 | Hagino | .................. | G01D 5/145 324/207.2 |

(Continued)

FOREIGN PATENT DOCUMENTS

EP    2755306 A2    7/2014

OTHER PUBLICATIONS

European Search Report for EP16194928.4, dated Jul. 11, 2017.

*Primary Examiner* — Huy Q Phan
*Assistant Examiner* — David Frederiksen
(74) *Attorney, Agent, or Firm* — Fishman Stewart PLLC

(57) ABSTRACT

A rotational angle detecting device may include a flat face part formed on a detected object, and a permanent magnet having a magnetic pole face facing the flat face part. The device may also include a pair of first yokes arranged in line symmetry along a magnetization direction and project in parallel with a rotational axis of the detected object from the permanent magnet, and a second yoke spaced from projecting ends of the first yokes to face a face of the permanent magnet, the first yokes projecting from the face. The device may further include a magnetic detection element having a magnetic sensitive part positioned in a detection point corresponding to each of the first yokes, and may be configured to detect magnetic flux densities in directions parallel with the rotational axis and a magnetic flux density in a direction perpendicular to the rotational axis and the reference line.

9 Claims, 7 Drawing Sheets

(56) References Cited

U.S. PATENT DOCUMENTS

| | | | |
|---|---|---|---|
| 2007/0229061 A1* | 10/2007 | Uryu | G01D 5/145 |
| | | | 324/207.25 |
| 2013/0033259 A1 | 2/2013 | Hara et al. | |
| 2013/0113467 A1* | 5/2013 | Sasada | G01D 5/2013 |
| | | | 324/207.15 |
| 2013/0314079 A1* | 11/2013 | Suzuki | G01D 5/145 |
| | | | 324/207.25 |
| 2014/0130612 A1* | 5/2014 | Takahashi | B62D 6/10 |
| | | | 73/862.193 |
| 2014/0225595 A1* | 8/2014 | Sato | H03K 17/9505 |
| | | | 324/207.2 |

\* cited by examiner

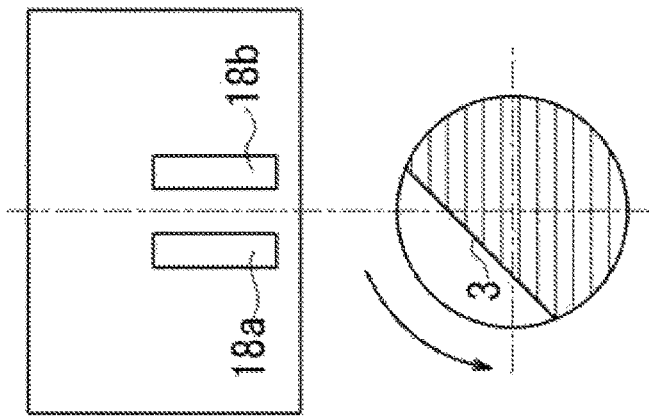
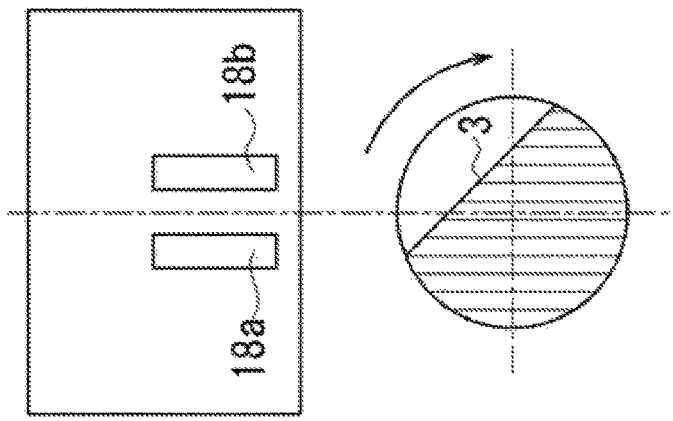
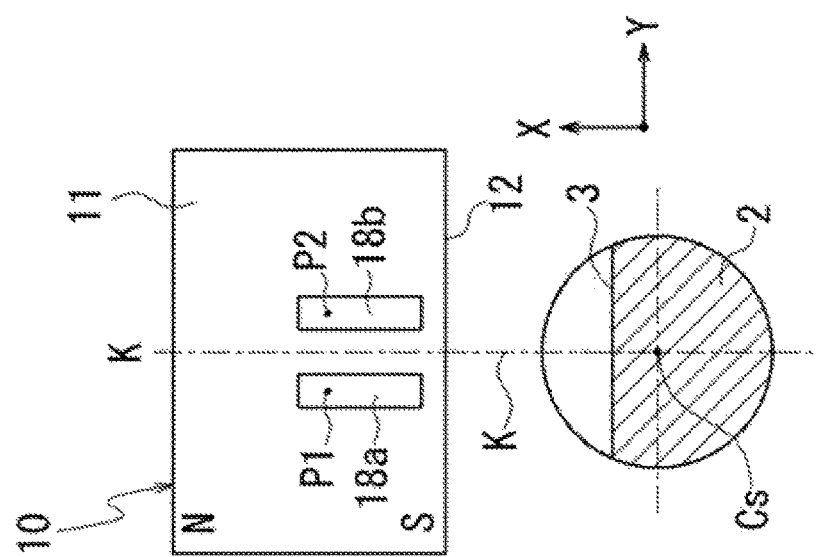

ROTATIONAL ANGLE DETECTING DEVICE AND ANGLE SENSOR UNIT USED THEREIN

CROSS-REFERENCE TO RELATED APPLICATION

This application claims priority under 35 USC 119 from Japanese Patent Application No. 2015-216218 filed on Nov. 3, 2015, the disclosure of which is incorporated by reference herein.

TECHNICAL FIELD

The present invention relates to a rotational angle detecting device for detecting a rotational angle of a detected object, and an angle sensor unit used therein.

BACKGROUND

A rotational angle detecting device is used for shift position detection of an automatic transmission and depression angle detection of an accelerator pedal or a brake pedal for a vehicle, and in recent years a magnetic type thereof adapted for severe in-vehicle environments such as vibrations, temperature changes and dusts has been increasingly in demand.

For example, Japanese Patent No. 5131537 discloses a conventional rotational angle detecting device of a magnetic type configured of a rotational member on the periphery of a rotational center of which permanent magnets are arranged to alternate an N pole region thereof with an S pole region thereof, and a plate-shaped magnetic plate and magnetic detection elements arranged in a predetermined position to the rotational member, wherein a rotational angle of the rotational member is calculated based upon the detection result of magnetic field components in two directions in the magnetic plate.

However, according to the conventional rotational angle detecting device, when the rotational member equipped with the permanent magnets is included in the angle sensor unit positioned to face the detected object, because of rotating the rotational member in association with the detected object, a rotation transmitting mechanism for transmitting the rotation of the detected object becomes necessary. Therefore constraint conditions on the detected object and its installation portion are increased and further, high detection precision cannot be obtained because of mechanical errors in the rotation transmitting mechanism.

Further, the angle sensor unit accommodated in a case and formed as a one-piece product is internally required to air-tightly form a space accommodating the rotational member and hold the rotational member with good positional accuracy. Therefore the angle sensor unit is difficult to be miniaturized and its complicated holding structure causes an increase in manufacturing costs.

In addition, even if the rotational member and the detected object are formed as a one-piece combined body by making the detected object penetrate through an axis center of the rotational member for making the rotation transmitting mechanism unnecessary, precision work for its combination causes an increase in costs and it is difficult to perform an appropriate seal on the angle sensor unit side.

Further, even if the permanent magnet is attached to the detected object by eliminating the rotational member, it complicates the manufacturing process for forming a mounting structure thereof on the detected object and requires a strict management on magnetic contamination due to attachment of small pieces and micronized powder of magnetic substances containing metallic materials in the manufacturing process.

In addition, when eccentricity of a rotational axis of the detected object occurs, a rotational axis of the permanent magnet is also shifted in position to change a relative positional relation to a magnetic detection element, thus creating variations in output signals.

Therefore even if any of the above-mentioned measures is adopted, it is difficult to accomplish both the detection precision and the low manufacturing cost in the structure of rotating the permanent magnet in association with the detected object.

SUMMARY

Therefore the present invention is made in view of the aforementioned problems in the conventional rotational angle detecting device, and an object of the present invention is to provide a rotational angle detecting device and an angle sensor unit used therein that can obtain high detection precision and can be realized in a low cost by eliminating the structure of rotating the permanent magnet.

According to the present invention, there is provided a rotational angle detecting device comprising:
a flat face part formed on a detected object;
a permanent magnet having a magnetic pole face of one end in a magnetization direction, the magnetic pole face facing the flat face part to be in parallel therewith;
a pair of first yokes that are arranged in line symmetry with respect to a reference line passing a rotational axis of the detected object and along the magnetization direction and project in parallel with the rotational axis of the detected object from the permanent magnet;
a second yoke arranged to be spaced from projecting ends of the first yokes and face a face of the permanent magnet, the first yokes projecting from the face; and
a magnetic detection element a magnetic sensitive part of which is positioned in a detection point corresponding to each of the first yokes in the space, wherein a rotational angle of the detected object is calculated based upon a magnetic flux density in a direction in parallel with the rotational axis and a magnetic flux density in a direction perpendicular to the rotational axis and the reference line, which are detected by the magnetic detection element.

According to the present invention, the rotation transmitting mechanism is not necessary because of detecting the rotation of the detected objet based upon a change in distance between the flat face part of the detected object and the first yokes. In addition, the permanent magnet, the first yokes, the second yoke and the magnetic detection element can be formed as the one-piece angle sensor unit. Therefore since the angle sensor unit is easy to be handled and the complicated holding structure of the rotational member and the air-tight accommodation space are not required therein, the angle sensor unit can be manufactured in low costs and miniaturized as a whole, and a degree of freedom to the application object and the installation portion is large and the mechanical errors are eliminated, thus making it possible to obtain high detection precision.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIGS. 4A, 4B and 4C are diagrams each explaining a relation between a rotational position of a shaft and the angle sensor unit;

DETAILED DESCRIPTION

Hereinafter, an explanation will be made of a rotational angle detecting device according to a first embodiment of the present invention.

Figure 1:
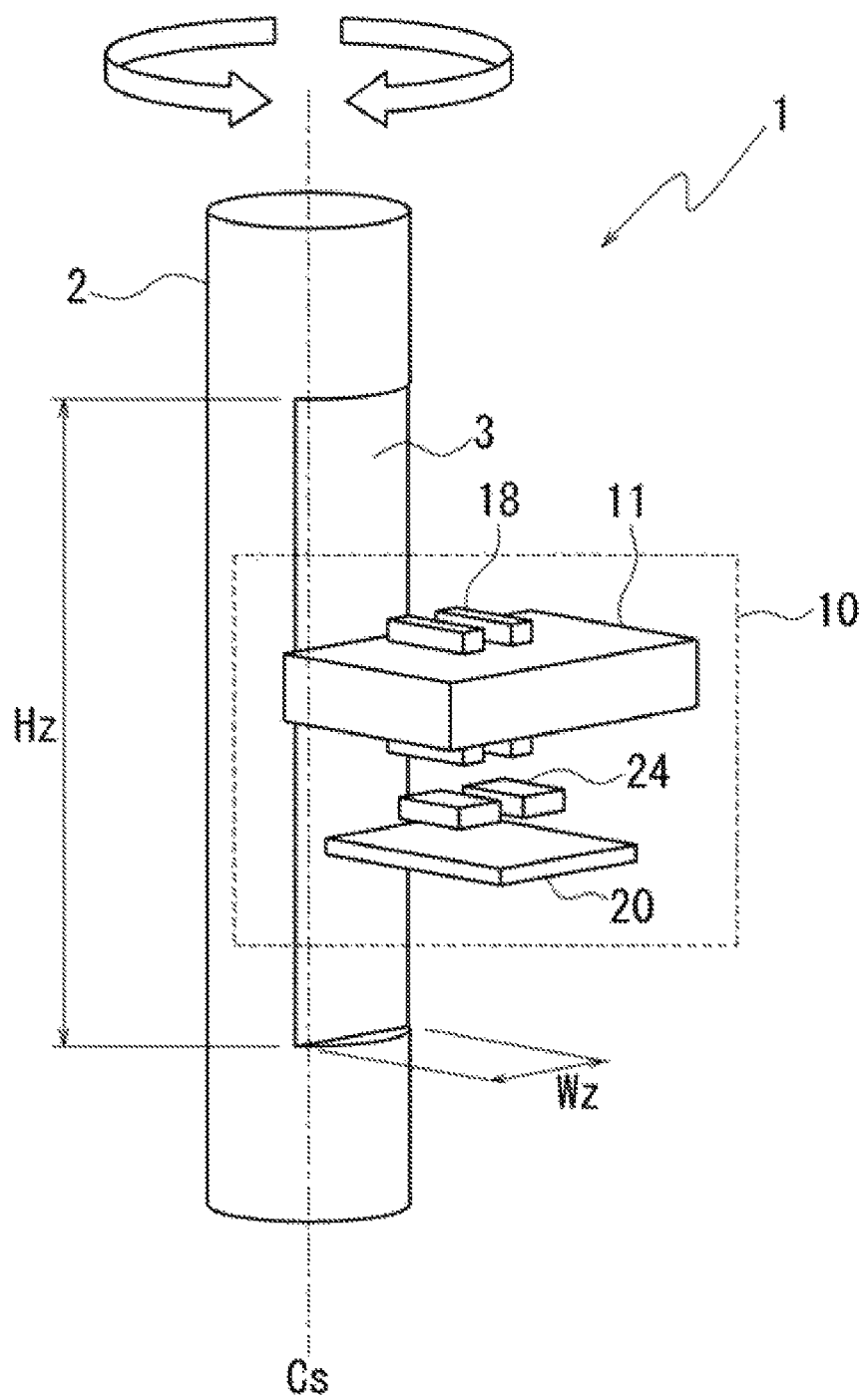
FIG. 1 is a perspective view illustrating an entire structure of a rotational angle detecting device according to a first embodiment of the present invention.
Figure 2C:
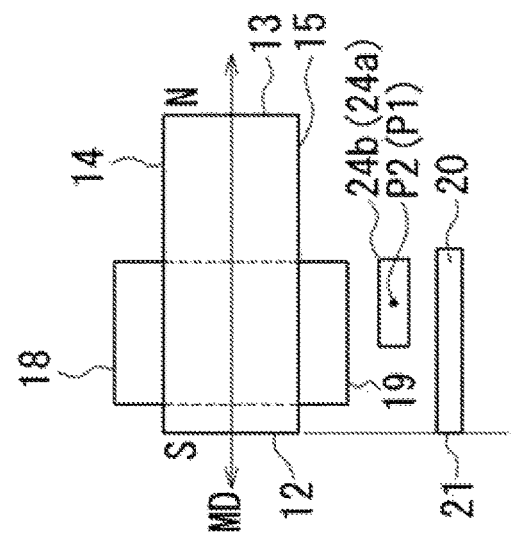
FIG. 2C is a side view illustrating the details of the angle sensor unit.
Figure 2A:
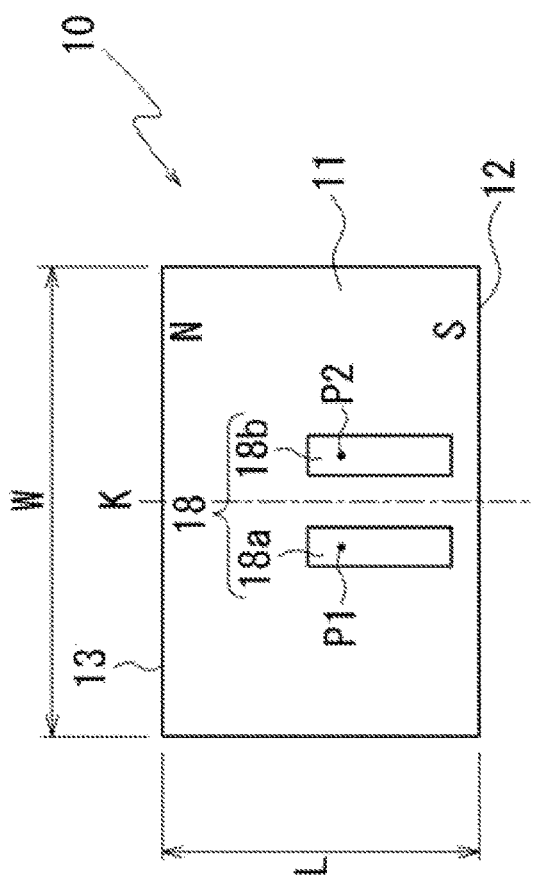
FIG. 2A is a plan view illustrating the details of an angle sensor unit in the rotational angle detecting device.
Figure 2B:
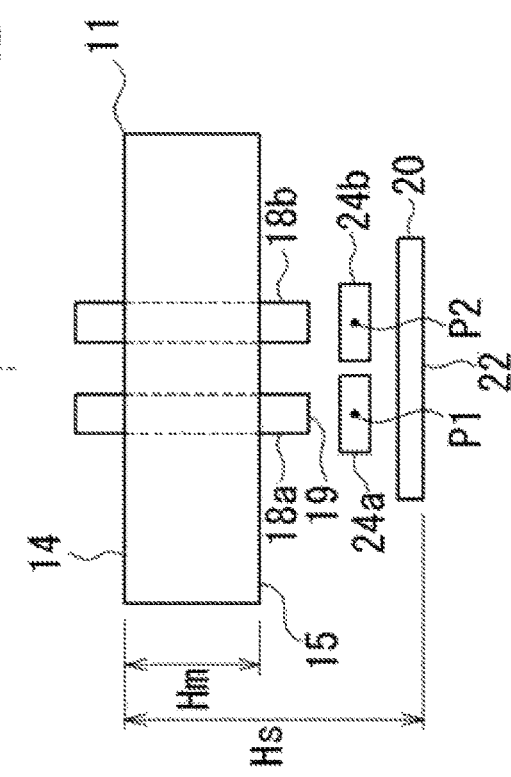
FIG. 2B is a front view illustrating the details of the angle sensor unit.

FIG. 1 is a perspective view illustrating an entire structure of a rotational angle detecting device 1 according to a first embodiment of the present invention. FIGS. 2A to 2C are diagrams illustrating an angle sensor unit 10, wherein FIG. 2A is a plan view thereof, FIG. 2B is a front view thereof and FIG. 2C is a side view thereof.

The rotational angle detecting device 1 is structured so that the angle sensor unit 10 is arranged to face a shaft 2 rotating as a detected object.

First, an explanation will be made of the angle sensor unit 10.

As illustrated in FIGS. 2A to 2C, the angle sensor unit 10 is structured so that a pair of first yokes 18 (18a, 18b) are attached on a permanent magnet 11 and a second yoke 20 is disposed in parallel with the permanent magnet 11 to face the first yokes 18 with a predetermined space therefrom.

The permanent magnet 11 is formed of a magnetic material of rare-earth isotropic neodymium bond by ejection molding, and is a cuboid having a length L, a width W and a height Hm. In the side view of FIG. 2C, the left end thereof acts as a south pole (S pole) and the right end thereof acts as a north pole (N pole). A straight line passing a center of each of magnetic pole faces 12, 13 of the S pole and the N pole is defined as a reference line K of the permanent magnet 11.

The pair of the yokes 18 each are composed of a sintered material formed of pure iron powder, and are formed as a magnetic body in a flat plate shape. The respective first yokes 18a, 18b have flat plate faces that are positioned to be perpendicular to the magnetic pole faces 12, 13 of the S pole and the N pole of the permanent magnet 11, that is, in parallel with the reference line K. In addition, in the plan view in FIG. 2A, the first yokes 18a and 18b are positioned to be closer to the S pole of the permanent magnet 11, line-symmetric with respect to the reference line K, and in a distance equal from the magnetic pole face 12 of the S pole. In addition, as illustrated in FIGS. 2B and 2C, each of the first yokes 18a, 18b extends from at least a lower face 15 of permanent magnet 11 and projects to the second yoke 20-side. Preferably a distance between the first yokes 18a, 18b is from 2 to 4 mm and a projecting amount thereof to the second yoke 20-side is from 1 to 2 mm.

It should be noted that the first yokes 18 are inserted at ejection molding of the permanent magnet 11 to be united to and held in the permanent magnet 11, and penetrate the permanent magnet 11 and project also from an upper face 14 at the opposite side to the second yoke 20, which act as gripping parts at the inserting.

The second yoke 20 is a magnetic body made up of a press iron plate, and a plate face thereof has an area that is large enough for entirely facing the respective lower end faces 19 of the first yokes 18a, 18b. Particularly the second yoke 20 extends, as illustrated in FIG. 2C, from a region facing the lower end face 19 of the first yoke 18 to the S pole side in the magnetization direction MD of the permanent magnet 11, thus arranging a front end face 21 thereof to be flush with a magnetic pole face 12 of the S pole, that is, to conform with extension of the magnetic pole face 12.

Detection points P (P1, P2) of magnetism are set in a space between the first yokes 18a, 18b and the second yoke 20, and hall ICs 24 (24a, 24b) are arranged to conform magnetic sensitive parts thereof with the detection points P. In the illustration, the two hall ICs 24a, 24b are arranged to correspond to the detection points P1, P2 respectively, but instead of the two hall ICs, a single hall IC may be arranged if it is equipped with two magnetic sensitive parts corresponding to the detection points P1, P2 in two places.

The hall ICs 24 perform predetermined calculations based upon the magnetic flux densities in the two directions detected by the magnetic sensitive parts, which will be described later.

A height from a lower face 22 of the second yoke 20 to the upper face 14 of the permanent magnet 11 is called a detection face height Hs of the angle sensor unit 10.

The permanent magnet 11, the first yokes 18, the second yoke 20 and the hall ICs 24, which are described above, are accommodated in a case (unillustrated), and therefore the angle sensor unit 10 is in the form of a one-piece independent product and easy to be handled.

Since there is no movable member in the angle sensor unit 10, a space for accommodating it is not necessary and the respective components can be assembled in accurate relative positions. Accordingly, the case can be of a sealing type that may be sealed by a sealing resin or the like, and thereby highly accurate positional relations between the respective components can be stably maintained.

It should be noted that magnetization of the permanent magnet 11 is preferably performed in a state of holding the first yokes 18, further preferably in a state of being assembled together with the second yoke 20 and the hall ICs 24 to be accommodated in the case. A possibility of the magnetic contamination in each working step of the assembling process is eliminated and the process management becomes easy.

Next, the shaft 2 of an iron material that is the detected object is provided with a flat face part 3 formed thereon by cutting a part of a column thereof, having a height (flat face part height) Hz and a width (flat face part width) Wz.

The angle sensor unit 10 is arranged so that the magnetic pole face 12 of the S pole of the permanent magnet 11 and the front end face 21 of the second yoke 20 face the flat face part 3 of the shaft 2. The reference line K passing each center of the magnetic pole faces 12, 13 of the permanent magnet 11 is set to traverse a rotational axis Cs of the shaft 2 and be vertical to the rotational axis Cs.

The flat face part height Hz is set to be greater than an addition value of the detection face height Hs (refer to FIG. 2B) of the angle sensor unit 10 and an estimated positional shift amount of the shaft 2 in the rotational axis Cs direction.

Figure 3:
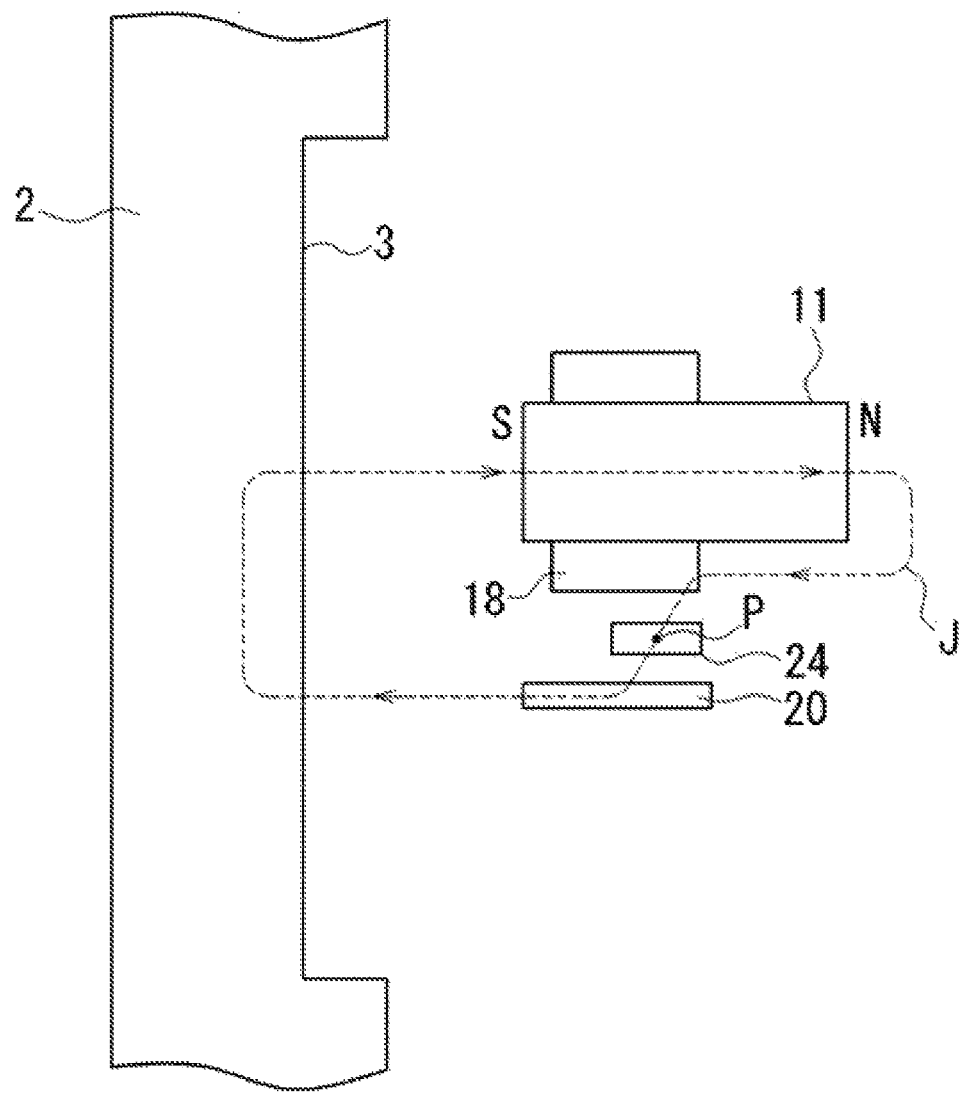
FIG. 3 is a diagram explaining a magnetic flux line route in the rotational angle detecting device.

Therefore, as illustrated in FIG. 3, a magnetic flux line J by the permanent magnet 11 has a route of passing from the N pole and via the first yoke 18 through the second yoke 20, and further, going back to the S pole via the shaft 2. Then in the detection point P, the hall IC 24 detects the magnetic flux density.

FIGS. 4A to 4C illustrate an arrangement relation between the shaft 2 and the angle sensor unit 10 as viewed from the rotational axis Cs direction of the shaft 2. FIG. 4A illustrates a state where the flat face part 3 of the shaft 2 is in parallel with the magnetic pole face 12 of the S pole of the permanent magnet 11, which is set as a reference position of rotation of the shaft 2.

FIG. 4B illustrates a state where the shaft 2 rotates in a clockwise (right) rotation from the reference position, having a minus value such as −45 degrees. FIG. 4C illustrates a state where the shaft 2 rotates in a counterclockwise (left) rotation from the reference position, having a plus value such as +45 degrees.

Herein a direction extending in parallel with the reference line K of the permanent magnet 11 is defined as X direction, a direction extending in parallel with the rotational axis Cs of the shaft 2 is defined as Z direction and a direction perpendicular to these X and Z directions and extending in parallel with the flat face part 3 in the reference position of the shaft 2 is defined as Y direction.

The hall ICs 24a, 24b of the angle sensor unit 10 detect magnetic flux densities in the two directions of the Z direction and Y direction in the detection points P1, P2 corresponding thereto.

The route of the magnetic flux line J illustrated in FIG. 3 mentioned above is divided into two lines of a route passing the first yoke 18a and a route passing the first yoke 18b since the first yokes 18a and 18b are arranged to be spaced from each other as illustrated in FIG. 2A. Between the two routes, a distance (X direction) between each of the first yokes 18a, 18b and the flat face part 3 changes with rotation of the shaft 2.

That is, when the shat 2 is in the reference position (0 degrees), a distance between the first yoke 18a and the flat face part 3 is equal to a distance between the first yoke 18b and the flat face part 3, but when the shaft 2 rotates in a clockwise rotation (direction of −45 degrees) from the reference position, the distance between the first yoke 18a and the flat face part 3 becomes shorter, and on the other hand, the distance between the first yoke 18b and the flat face part 3 becomes longer. In reverse, when the shaft 2 rotates in a counterclockwise rotation (direction of +45 degrees) from the reference position, the distance between the first yoke 18a and the flat face part 3 becomes longer, and on the other hand, the distance between the first yoke 18b and the flat face part 3 becomes shorter.

The change in distance between each of the first yokes 18a, 18b and the flat face part 3 causes a difference in change of the magnetic flux density in the Z direction and the magnetic flux density in the Y direction between the detection points P1, P2 as well.

Figure 5A:
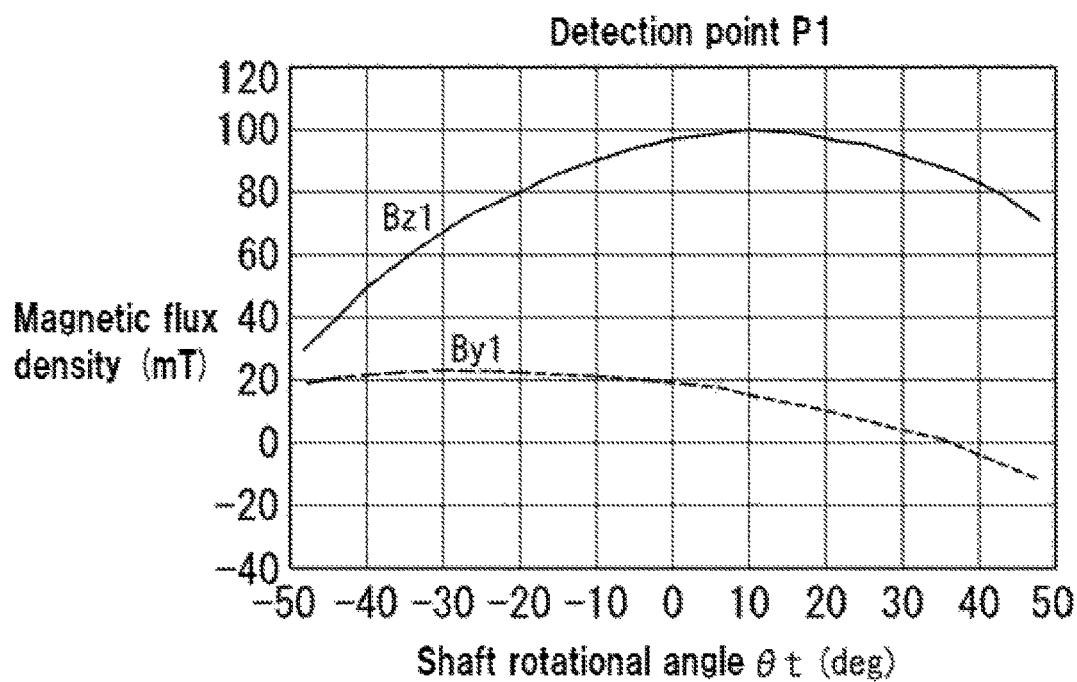
FIGS. 5A and 5B are diagram each explaining a change in magnetic flux density in two directions to the rotational angle of the shaft.
Figure 5B:
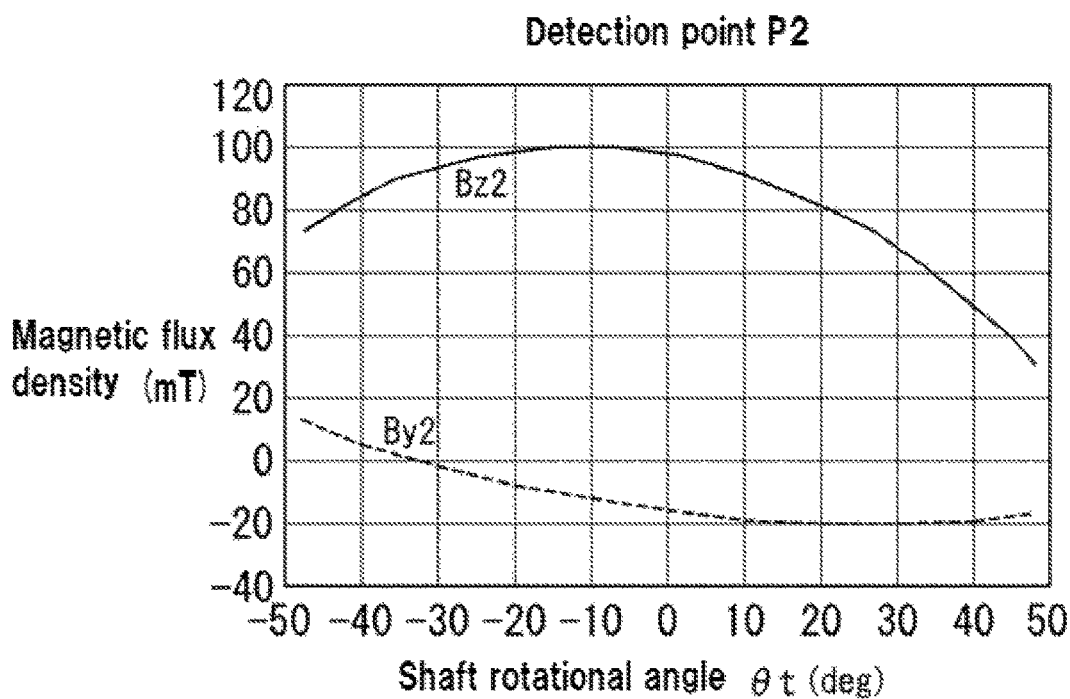

FIGS. 5A and 5B are graphs each indicating a change in magnetic flux density detected at the time of rotating the shaft 2, wherein FIG. 5A indicates the detection result in the detection point P1, and FIG. 5B indicates the detection result in the detection point P2.

The angle sensor unit 10 used for measurement is structured in such a way that, to the shaft 2 having a diameter of 11 mm in an assumed rotation angle range of approximately 90 degrees, the permanent magnet 11 is sized to have a height (Hm) of 5 mm of each of the magnetic pole faces 12, 13, a width (W) of 20 mm and a length (L) of 13 mm, the first yokes 18a, 18b each have a length of 6 mm, a height of 8 mm, a plate thickness of 1.4 mm and a projecting amount of 1.5 mm to each of the second yoke 20-side and the opposite side, a distance between the first yokes 18a, 18b having the reference line K therebetween is set to 2.5 mm and the second yoke 20 has a length of 7.5 mm, a width of 10 mm and a plate thickness of 1 mm. The hall ICs 24 are made of ams AG-made AS5403, equipped with two magnetic sensitive parts. The shaft 2 having a diameter of 11 m is provided with the flat face part 3 formed thereon, having a flat face part width (Wz) of 10.25 mm and a flat face part height (Hz) of 30 mm. A distance between the flat face part 3 in the reference position of the shaft 2 and the magnetic pole face 12 of the S pole in the permanent magnet 11 is 5 mm.

In FIG. 5A, Bz1 indicates the magnetic flux density in the Z direction in the detection point P1 and By1 indicates the magnetic flux density in the Y direction in the detection point P1. In FIG. 5B, Bz2 indicates the magnetic flux density in the Z direction in the detection point P2 and By2 indicates the magnetic flux density in the Y direction in the detection point P2. Each of them draws a predetermined curve to a rotational angle θt of the shaft 2.

Figure 6:
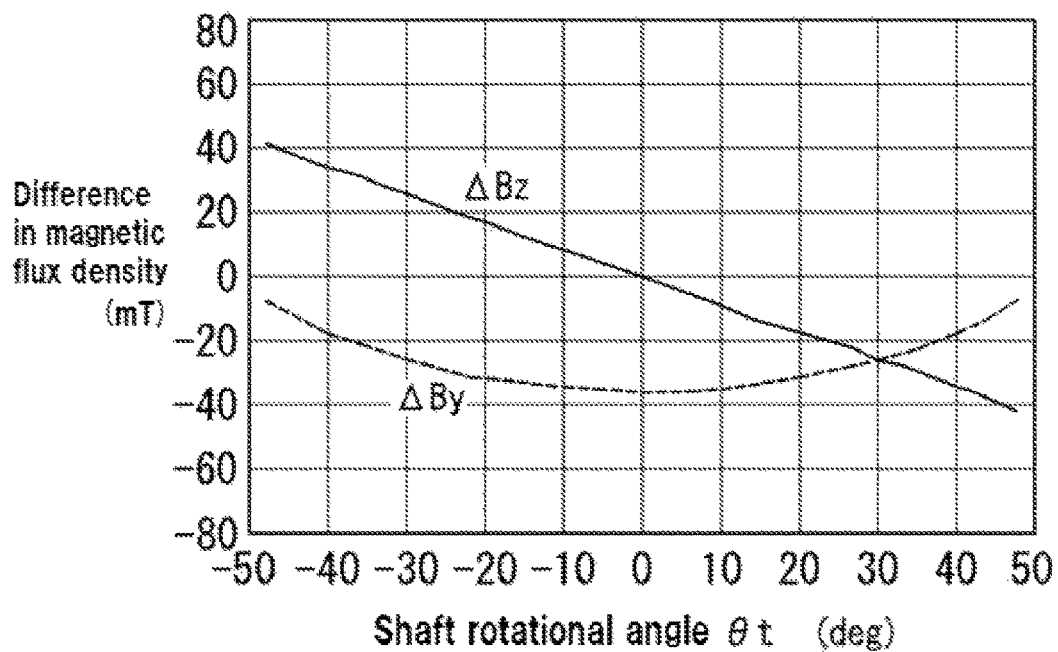
FIG. 6 is a diagram illustrating a difference in magnetic flux density between two detection points.

When the hall ICs 24 calculate a difference $\Delta Bz$ in magnetic flux density in the Z direction and a difference $\Delta By$ in magnetic flux density in the Y direction according to the following formulas, the difference result in magnetic flux density indicated in FIG. 6 is obtained.

$$\Delta Bz = Bz2 - Bz1$$

$$\Delta By = By2 - By1$$

Further, the hall ICs 24 obtain a calculation angle θc according to the following formula based upon the difference $\Delta Bz$ in magnetic flux density in the Z direction and the difference $\Delta By$ in magnetic flux density in the Y direction.

$$\theta c = \text{Arctan}\,(\Delta Bz/\Delta By)$$

Figure 7:
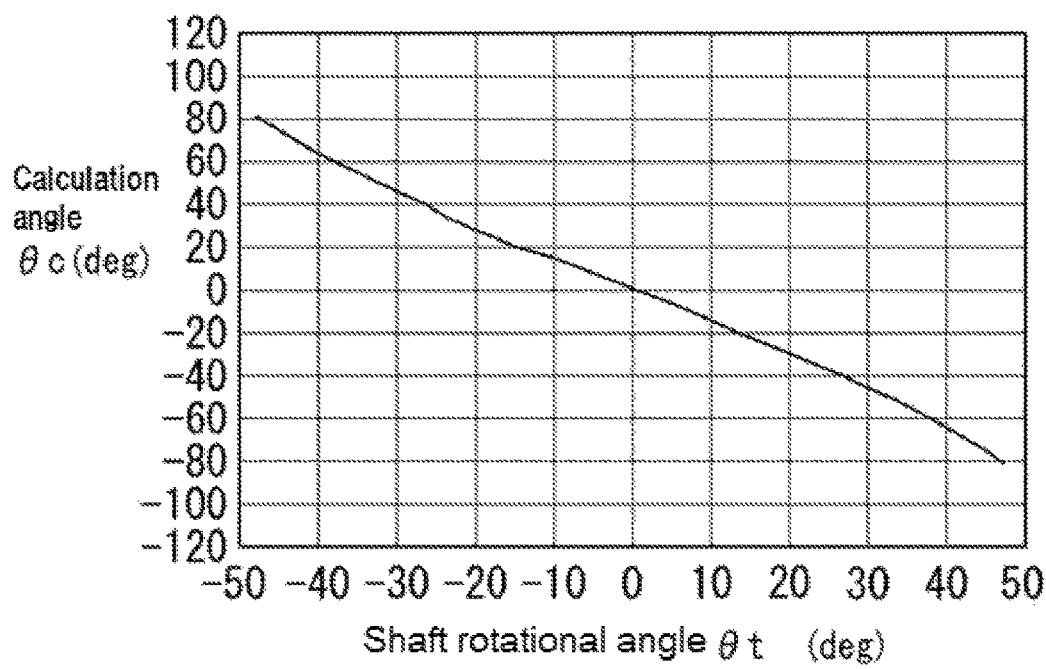
FIG. 7 is a diagram illustrating a calculation angle found from the difference in magnetic flux density.

FIG. 7 is a graph indicating the calculation angle θc. The calculation angle θc is indicated approximately in a straight line in an entire region from −45 degrees to +45 degrees of the rotational angle of the shaft 2, and it is found out that the calculation angle θc has a proportional relation to the rotational angle of the shaft 2. As a result, since an actual rotational angle θt of the shaft 2 can be obtained by multiplying a calculation angle θc output as a detection signal by the hall IC 24 by a predetermined coefficient, finding the calculation angle θc is substantially equivalent to finding the rotational angle of the shaft 2.

In addition, the found calculation angle θc is converted into a predetermined electrical signal to be output.

It should be noted that since the flat face part height Hz of the shaft 2 is set to be greater than an addition value of the detection face height Hs and the positional shift amount of the shaft 2 in the direction of the rotational axis Cs, the calculation angle θc is not subjected to any influence of the positional shift in the Z direction.

In addition, in a specific example of the rotational angle detecting device used for the aforementioned measurement, as to the positional shift in the Y direction, variations in calculation angle θc are within +0.5% to −0.5% or less in a range where the positional shift amount in the Y direction is from +0.5 mm to −0.5 mm. Thus the specific example has shown more excellent positional shift characteristics to the shaft as compared to a general variation of approximately +1.5% to −1.5% in the conventional rotational angle detecting device having the rotational permanent magnet.

That is, since the present embodiment has no variation in detection characteristics by the positional shift of the shaft or controls the variation to be small, it has so-called high robustness.

As to magnetic noises from an exterior, since the first yokes 18a, 18b are arranged in line symmetry with respect to the reference line K (X direction) of the permanent magnet 11 passing the rotational axis Cs of the shaft 2, a variation amount of the magnetic flux density by the magnetic noises in the X direction is equal between the points P1, P2, and the calculation angle θc based upon the difference in magnetic flux density is not influenced. This is true of magnetic noises in the Z direction, and the calculation angle θc has an extremely large resistance to the magnetic noises in the two directions.

In the present embodiment, the shaft 2 corresponds to a detected object in the present invention, and the magnetic pole face 12 of the S pole in the permanent magnet 11 corresponds to a magnetic pole face of one end in the magnetization direction.

The lower face 15 of the permanent magnet 11 corresponds to a face from which the first yoke projects, and the lower end face 19 of the first yoke 18 corresponds to a projecting lower end.

The hall IC 24 corresponds to a magnetic detection element, the magnetic flux densities Bz1, Bz2 in the Z direction correspond to magnetic flux densities in the direction in parallel with the rotational axis, and the magnetic flux densities By1, By2 in the Y direction correspond to magnetic flux densities in the direction perpendicular to the rotational axis and the reference line.

The first embodiment is configured as described above, and is provided with the rotational angle detecting device comprising:

the flat face part 3 formed on the shaft 2;

the permanent magnet 11 having the magnetic pole face 12 of the S pole facing the flat face part 3 in parallel therewith;

the pair of first yokes 18 (18a, 18b) that are arranged in line symmetry with respect to the reference line K passing the rotational axis Cs of the shaft 2 and along the magnetization direction MD of the permanent magnet 11 and project in parallel with the rotational axis Cs from the permanent magnet 11;

the second yoke 20 arranged to face the lower face 15 of the permanent magnet 11 from which the first yokes 18 project and be spaced from the lower end faces 19 of the first yokes 18; and the hall ICs 24 magnetic sensitive parts of which are positioned in the detection points P1, P2 corresponding to the respective first yokes 18a, 18b in the space, wherein the rotational angle of the shaft 2 is calculated based upon the magnetic flux densities Bz1, Bz2 in the Z direction in parallel with the rotational axis Cs and the magnetic flux densities By1, By2 in the Y direction perpendicular to the rotational axis Cs and the reference line K, which are detected by the hall ICs 24.

The rotation transmitting mechanism is not necessary because of detecting the rotation of the shaft 2 based upon a change in distance between the flat face part 3 and the first yokes 18. In addition, the permanent magnet 11, the first yokes 18, the second yoke 20 and the hall ICs 24 can be formed as the one-piece angle sensor unit 10. Therefore the complicated holding structure of the rotational member and the air-tight accommodation space are not required therein. As a result, the angle sensor unit can be manufactured in low costs and miniaturized as a whole, and a degree of freedom to the application object and the installation portion is large and the mechanical errors are eliminated, thus making it possible to obtain high detection precision.

In the hall ICs 24, the difference in magnetic flux density in the Z direction and the difference in magnetic flux density in the Y direction between the detection points P1, P2 are calculated, and the rotational angle of the shaft 2 is found based upon both of the differences. Therefore the variation in detection characteristics by the positional shift of the rotational axis in the shaft 2 is suppressed, and the variation in detection characteristics is suppressed also to the external magnetic noises, thus creating high robustness. (Effect corresponding to claim 2)

According to the first embodiment, since the first yokes 18a, 18b are arranged in parallel with each other having the reference line K therebetween, it is not subjected to the influence of the magnetic noises from this point as well. (Effect corresponding to claim 4)

The permanent magnet 11 is formed by ejection molding, and the first yokes 18 are inserted at ejection molding to be held by the permanent magnet 11. Therefore, as compared to a case of separately assembling the first yokes 18 to the molded permanent magnet, an accurate assembling structure is not required, there is no possibility of generation of clearances and the manufacture is easy. (Effect corresponding to claim 7)

In addition, the permanent magnet 11 is magnetized in a state of holding the first yokes 18 or after being assembled to the angle sensor unit 10, which makes it possible to avoid the variation in magnetic characteristics or the magnetic contamination in the middle of the assembling process. (Effect corresponding to claim 8)

Figure 8:
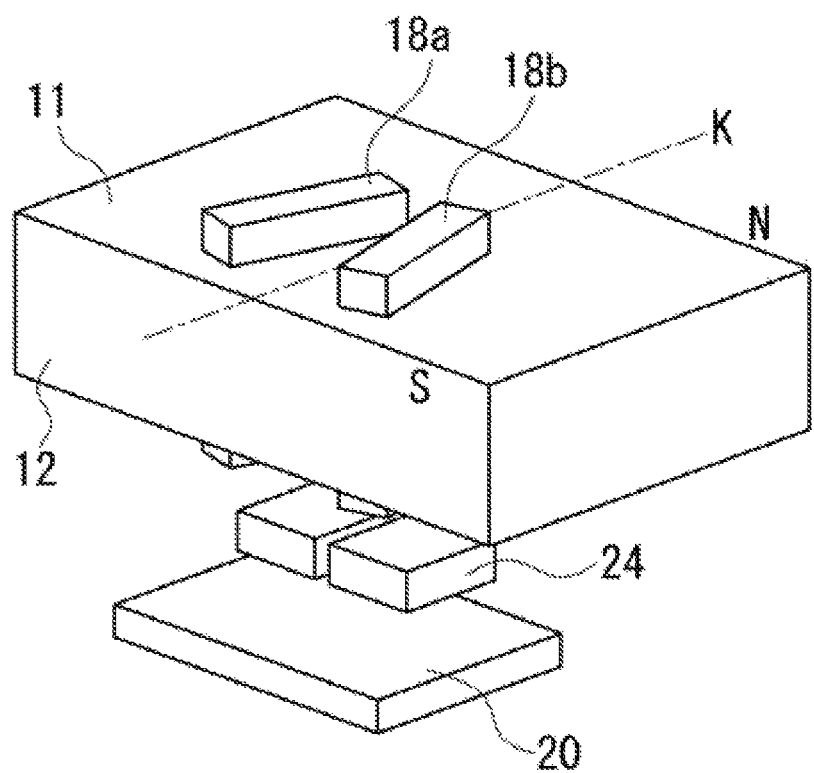
FIG. 8 is a perspective view illustrating a modification of the angle sensor unit.

Next, FIG. 8 illustrates a modification of an arrangement of first yokes in the angle sensor unit 10. First yokes 18a, 18b are arranged in line symmetry with respect to the reference line K of the permanent magnet 11 as similar to the first embodiment, but are inclined so that a separate distance from each other is larger in a side closer to the magnetic pole face 12 facing the flat face part 3 and smaller in a side farther therefrom, thus being formed in a wedge shape as viewed from above (Z direction). The other configuration is similar to that of the first embodiment.

As the inclination of the first yoke 18 is made larger, the detection accuracy of the angle sensor unit is the more susceptible to magnetic noises, but by inclining the first yokes 18 in a crossing angle of 30 degrees (each having the inclination angle of 15 degrees to the reference line K), for example, the magnetic flux densities in the Z direction and in the Y direction of the shaft 2 vary largely, which makes the detection sensitivity higher. Therefore the inclination angle can be set in consideration of the balance of both. (Effect corresponding to claim 5)

According to a second embodiment, the angle sensor unit 10 has the same structure as that of the first embodiment, but differs in the processing of magnetic flux densities detected in the detection points P (P1, P2) from the first embodiment.

In the first embodiment, the calculation on the difference in magnetic flux density is used, but in a case where the magnetic flux density applied to the detection point P is small, a difference in magnetic flux density also becomes small, which possibly makes a value of the calculation angle θc small.

Therefore in the present embodiment, an addition average calculation is used instead of the calculation on the difference.

That is, when the magnetic flux density in the Z direction and the magnetic flux density in the Y direction in the detection point P1 are indicated respectively at Bz1 and By1, and the magnetic flux density in the Z direction and the magnetic flux density in the Y direction in the detection point P2 are indicated respectively at Bz2 and By2, an average μBz of the magnetic flux densities in the Z direction and an average μBy of the magnetic flux densities in the Y direction will be calculated according to the following formulas.

$$\mu Bz = (Bz1 + Bz2)/2$$

$$\mu By = (By1 + By2)/2$$

Then these average values are used to find the calculation angle θc according to the following formula.

$$\theta c = \text{Arctan}\,(\mu Bz/\mu By)$$

These calculations can be performed by the hall ICs 24 detecting the magnetic flux densities in the detection points P, and the found calculation angle θc is converted into a predetermined electrical signal to be output.

According to the second embodiment, as compared to the first embodiment, the detection sensitivity is made better, and in a case where the magnetic flux density applied to the detection point P is small and in a case where the difference in magnetic flux density is small, a large value of the calculation angle θc can be obtained. Therefore the rotational angle of the shaft 2 having the high resolution can be obtained. (Effect corresponding to claim 3)

It should be noted that in the second embodiment also, the modification in FIG. 8 can be adopted in the arrangement of the first yokes 18a, 18b.

In the above embodiments, the first yokes 18 are inserted at the same time with the ejection molding of the permanent magnet 11 to be united therewith, but in a case of assembling the first yokes 18 after the formation of the permanent magnet 11, holes each matched with a shape and a size of the first yoke 18 are first formed in the permanent magnet 11, and then the first yokes 18 are inserted in the holes.

In addition, the magnetic pole face 12 of the S pole in the permanent magnet 11 is arranged to face the flat face part 3 of the shaft 2, but regardless of the polarity, the magnetic pole face 13 of the N pole may be arranged to face the flat face part 3 to reverse the direction of the flow of the magnetic flux line J. In this case, it is preferable to extend an end edge of the second yoke 20 facing the flat face part 3 to be flush with the magnetic pole face 13 of the N pole.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A rotational angle detecting device comprising:
a flat face part formed on a detected object;
a permanent magnet having a magnetic pole face of one end in a magnetization direction, the magnetic pole face facing the flat face part to be in parallel therewith;
a pair of first yokes that are arranged in line symmetry with respect to a reference line passing a rotational axis of the detected object and along the magnetization direction, and that project in parallel with the rotational axis of the detected object from the permanent magnet;
a second yoke arranged to be spaced from projecting ends of the first yokes to face a face of the permanent magnet, the first yokes projecting from the face; and
a magnetic detection element having a magnetic sensitive part positioned in a detection point corresponding to each of the first yokes in the space, wherein a rotational angle of the detected object is calculated based upon a magnetic flux density in a direction in parallel with the rotational axis and a magnetic flux density in a direction perpendicular to the rotational axis and the reference line, which are detected by the magnetic detection element.

2. The rotational angle detecting device according to claim 1, wherein the magnetic detection element calculates a difference in magnetic flux density in a direction in parallel with the rotational axis and a difference in magnetic flux density in a direction perpendicular to the rotational axis and the reference line between both of the detection points, and calculates the rotational angle of the detected object based upon both of the differences.

3. The rotational angle detecting device according to claim 2, wherein the pair of first yokes are arranged in parallel with each other, formed in a flat plate shape, and face with each other with planes thereof.

4. The rotational angle detecting device according to claim 2, wherein the pair of first yokes are formed in a flat plate shape to face with each other with planes thereof, and are arranged to be inclined so that a separate distance therebetween facing with each other is larger in a side closer to a magnetic pole face facing the flat face part and smaller in a side farther therefrom.

5. The rotational angle detecting device according to claim 1, wherein the magnetic detection element calculates an addition average in magnetic flux density in a direction in parallel with the rotational axis and an addition average in magnetic flux density in a direction perpendicular to the rotational axis and the reference line in both of the detection points, and calculates the rotational angle of the detected object based upon both of the addition averages.

6. The rotational angle detecting device according to claim 5, wherein the pair of first yokes are arranged in parallel with each other, formed in a flat plate shape, and face with each other with planes thereof.

7. The rotational angle detecting device according to claim 5, wherein the pair of first yokes are formed in a flat plate shape to face with each other with planes thereof, and are arranged to be inclined so that a separate distance therebetween facing with each other is larger in a side closer to a magnetic pole face facing the flat face part and smaller in a side farther therefrom.

8. The rotational angle detecting device according to claim 1, wherein the pair of first yokes are arranged in parallel with each other, formed in a flat plate shape, and face with each other with planes thereof.

9. The rotational angle detecting device according to claim 1, wherein the pair of first yokes are formed in a flat plate shape to face with each other with planes thereof, and are arranged to be inclined so that a separate distance therebetween facing with each other is larger in a side closer to a magnetic pole face facing the flat face part and smaller in a side farther therefrom.

* * * * *